(12) United States Patent
Schlipf

(10) Patent No.: US 11,329,461 B2
(45) Date of Patent: May 10, 2022

(54) DEVICE WITH AN INTERNAL CONDUCTOR THAT IS ARRANGED WITHIN THE TUBE INTERIOR OF A TUBULAR METAL SHEATH AND IS INSULATED FROM THIS SHEATH WITH AN ELECTRICALLY INSULATING MATERIAL AND METHOD FOR MANUFACTURING SUCH A DEVICE

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

(*) Notice: Subject to any disclaimer, the term of this patent is extended or adjusted under 35 U.S.C. 154(b) by 0 days.

(21) Appl. No.: 17/068,934

(22) Filed: Oct. 13, 2020

(65) Prior Publication Data

US 2021/0111544 A1  Apr. 15, 2021

(30) Foreign Application Priority Data

Oct. 15, 2019 (DE) .................. 10 2019 127 688.8

(51) Int. Cl.
*F16L 5/02* (2006.01)
*H02G 3/04* (2006.01)

(52) U.S. Cl.
CPC .............. *H02G 3/0406* (2013.01); *F16L 5/02* (2013.01); *H02G 3/0462* (2013.01)

(58) Field of Classification Search
CPC ........ H02G 3/0406; H02G 3/0462; F16L 5/02

USPC ......................................................... 174/650
See application file for complete search history.

(56) References Cited

U.S. PATENT DOCUMENTS

| 6,111,198 | A  | * | 8/2000  | Tower .................. H01L 21/50 |
|           |    |   |         | 174/135 |
| 9,527,157 | B2 | * | 12/2016 | Kroll .................... B23K 26/32 |
| 2015/0270025 | A1 | * | 9/2015 | Specht ................ H01B 13/00 |
|           |    |   |         | 174/650 |
| 2015/0285033 | A1 | * | 10/2015 | Noel .................... E21B 36/04 |
|           |    |   |         | 166/60 |
| 2016/0329123 | A1 | * | 11/2016 | Mabuchi .............. H01B 3/04 |
| 2018/0324901 | A1 | * | 11/2018 | Schlipf ................ H05B 3/18 |

FOREIGN PATENT DOCUMENTS

GB           2518529       *  9/2014

* cited by examiner

*Primary Examiner* — Timothy J Thompson
*Assistant Examiner* — Michael F McAllister
(74) *Attorney, Agent, or Firm* — Panitch Schwarze Belisario & Nadel LLP

(57) ABSTRACT

A device is disclosed with an internal conductor, which is arranged within the tube interior of a tubular metal sheath and is electrically insulated from this sheath with a compacted, electrically insulating material, in which the compacted electrically insulating material is a compacted magnesium oxide granulate made from magnesium oxide grains of different sizes with edges and projections, and that sections, especially edges and projections of magnesium oxide grains are pressed, under local deformation of the internal conductor and/or the tubular metal sheath, into the internal conductor or into the tubular metal sheath. A method for manufacturing such a device is also disclosed.

19 Claims, 3 Drawing Sheets

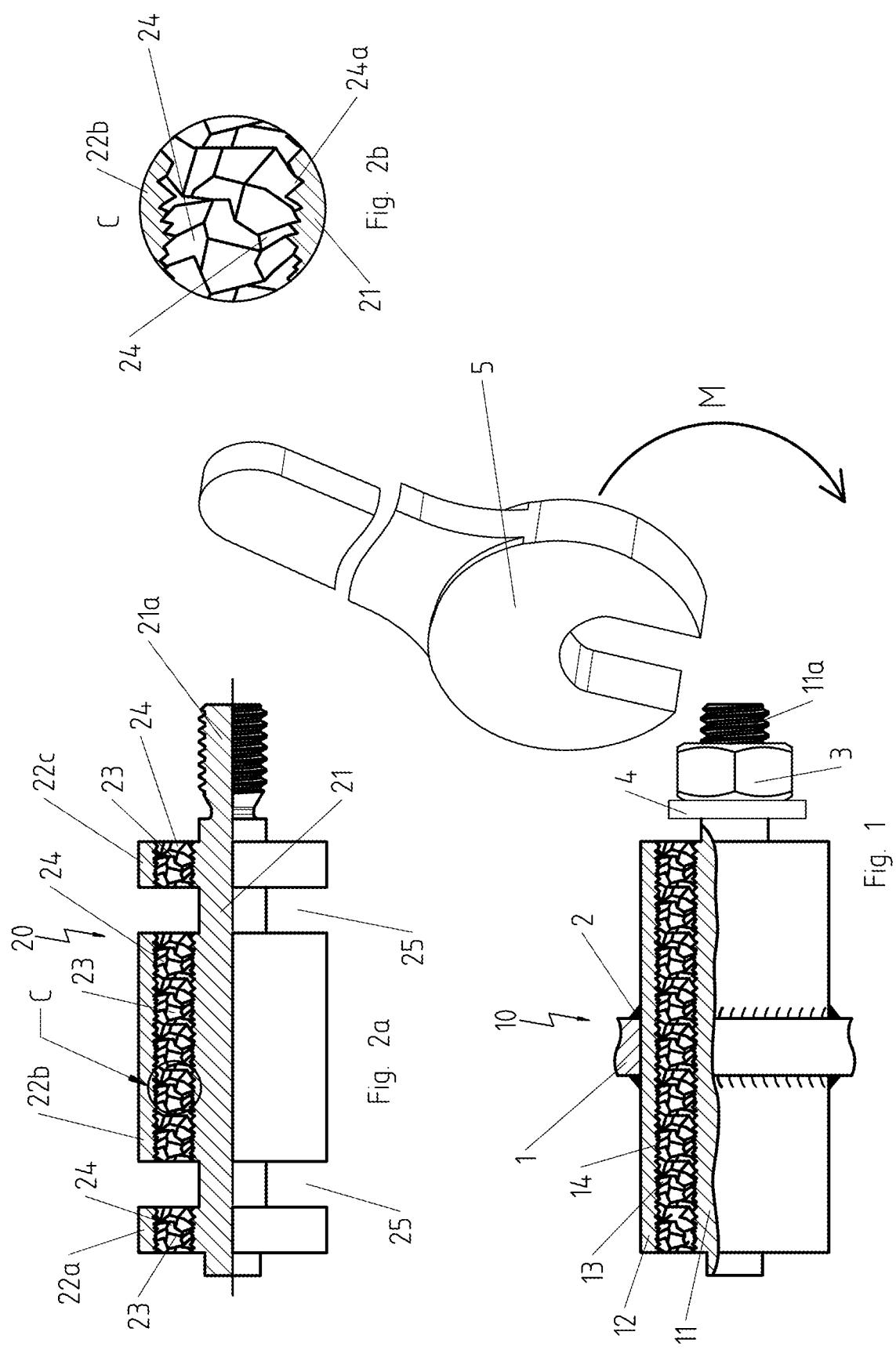

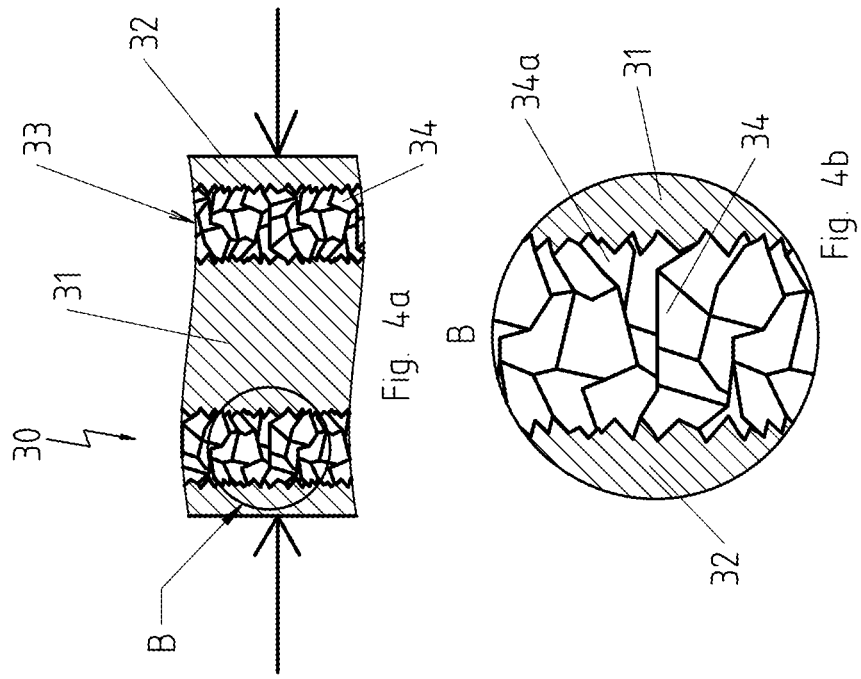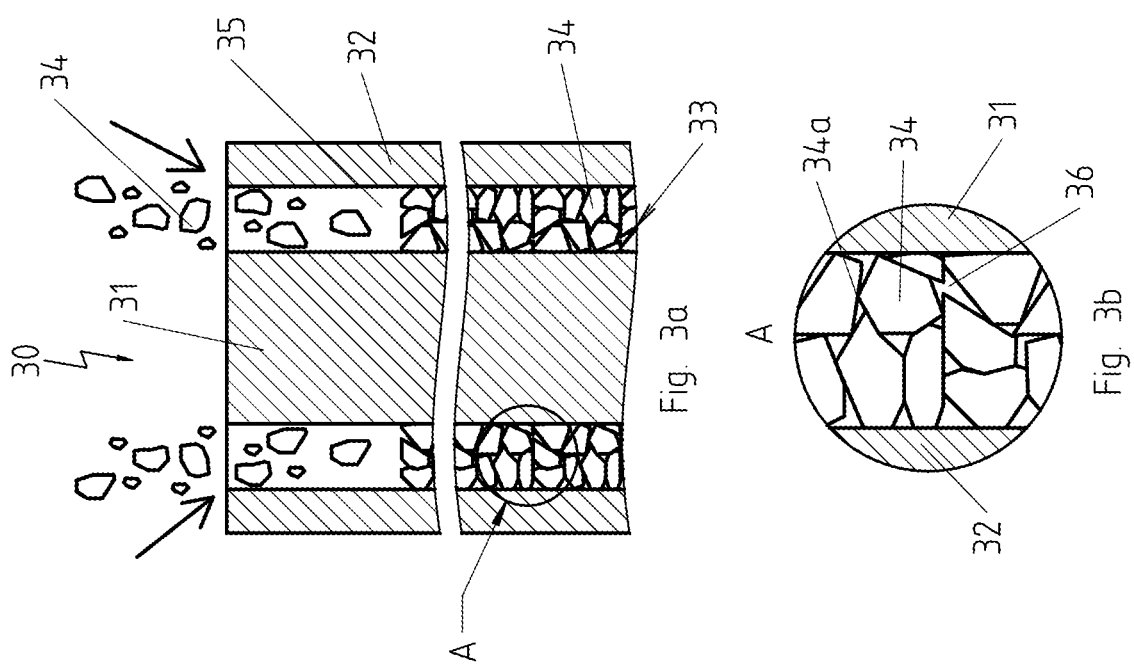

DEVICE WITH AN INTERNAL CONDUCTOR THAT IS ARRANGED WITHIN THE TUBE INTERIOR OF A TUBULAR METAL SHEATH AND IS INSULATED FROM THIS SHEATH WITH AN ELECTRICALLY INSULATING MATERIAL AND METHOD FOR MANUFACTURING SUCH A DEVICE

CROSS-REFERENCE TO RELATED APPLICATION

This application claims priority under 35 U.S.C. § 119 to German Patent Application No. 10 2019 127 688.8, filed on Oct. 15, 2019, the disclosure of which is incorporated herein by reference in its entirety.

BACKGROUND OF THE INVENTION

There is a series of devices with an internal conductor, which is arranged within the tube interior of a tubular metal sheath and is electrically insulated from this sheath with an electrically insulating material. These devices include, in particular, mineral-insulated sheathed cables, which are widely used for different applications, for example, as electrical feedthroughs through a wall made of metal.

In practical use, it has been shown that the mechanical stability of such devices often does not correspond to the high requirements of many technical environments. That is the case especially when the device is exposed during use to torsional forces, extraction forces, thrust, compression, and/or vibrations to a significant extent and/or when the internal conductor is used as a mount for a structure, for example, a honeycomb structure used in a pollutant emission control system.

The task of the invention is to provide a device with an internal conductor, which is arranged within the tube interior of a tubular metal sheath and is electrically insulated from this sheath with an electrically insulating material, which has improved resistance against the mechanical loads specified above. Another task is also to provide a method for manufacturing such a device.

BRIEF SUMMARY OF THE INVENTION

This task is achieved by a device with the features described and claimed herein and a method with the features of the device described and claimed herein. Advantageous refinements of the method are the subject matter of the dependent claims.

The device according to the invention with an internal conductor, which is arranged within the tube interior of a tubular metal sheath and is electrically insulated from this sheath with a compacted, electrically insulating material, is distinguished in that the compacted electrically insulating material is a compacted magnesium oxide granulate made from magnesium oxide grains of different sizes with edges and projections, and that sections, especially edges and projections of magnesium oxide grains are pressed, under local deformation of the internal conductor and/or the tubular metal sheath, into the internal conductor and/or into the tubular metal sheath.

This approach represents, in a certain way, a paradigm shift. Previously, the selection of the magnesium oxide being used and the pressure applied during the compaction process was always shaped decisively by the idea of maximizing creep resistance and resistance to moisture, which is why processing was done with very fine and regularly shaped magnesium oxide powder particles as much as possible, which were partially also preprocessed as a molded part, e.g., a tube, in order to obtain the most homogeneous possible insulating material layer in the compacting process.

The use according to the invention of a magnesium oxide granulate deviates fundamentally from the process described above. Different than a powder, a granulate in the sense of this disclosure has rough, irregular magnesium oxide grains with edges and projections, thus, not as round, wherein these magnesium oxide grains can also have, in particular, a relatively wide particle size distribution with a Full Width Half Maximum (FWHM) value for the width of the distribution, which can be between a few μm and over a hundred μm. The maximum of the magnesium oxide grain size distribution of the magnesium oxide granulate being used can be preferably in the range between approx. 30 μm and approx. 300 μm, from which it can be seen that just the particle size is not the decisive parameter.

An indirect, macroscopically detectable measure for these properties of the magnesium oxide granulate is the tap density or tapped density. Magnesium oxide granulate in the sense of this invention has, before the compacting process, a tapped density of less than 2.45 g/cm$^3$, while the density of magnesium oxide is specified with 3.58 g/cm$^3$. Thus, for the filling of the tubular metal sheath, an electrical insulation layer that has a considerable portion of empty volume, is initially produced.

While it would be intuitively assumed that sufficient creep resistance and moisture resistance could not be achieved due to the empty volume remaining within the area filled with electrically insulating material, because the empty volume would act against these properties, the inventor surprisingly determined that with the application of high pressure, sections of particles that are arranged adjacent to the internal conductor and/or tubular metal sheath, especially edges and projections of magnesium oxide grains, are pressed, under local deformation of the internal conductor and/or the tubular metal sheath, into the internal conductor and/or into the tubular metal sheath, nevertheless an electrical insulation layer with high creep resistance and moisture resistance can be achieved, which has also proven significantly more stable mechanically than known electrical insulation layers in such devices.

This improved mechanical stability also has a positive effect, in particular, on the mechanical break-away behavior at the end sides of the insulation layer on the end sides. It is also applicable especially in systems in which the internal conductor is also simultaneously used as a supporting element for the structure supplied by it with current, as is the case, for example, for the internal conductor of a feedthrough, which supports a honeycomb structure arranged in the exhaust duct.

Another advantage produced with the use of a magnesium oxide granulate according to the invention is that an improved tolerance compensation is achieved.

In addition, however, an improvement of the heat conductance of the electrical insulation layer is also realized. On one hand, a lower proportion of grain boundaries due to a higher proportion of larger magnesium oxide grains can contribute to this result. On the other hand, however, pressing the magnesium oxide grains into the internal conductor also benefits the heat dissipation, because the effective transfer surface area becomes larger.

In this way, for the compacting by the magnesium oxide granulate, an (additional) roughness is impressed onto the internal conductor and/or the tubular metal sheath. Experiments show that, for example, for typical internal conductor materials, arithmetical mean deviation values of the roughness profile $R_a$ of a few μm and average smoothness depths $R_p$ of around 10 μm can be achieved.

The pressure required for the compacting process can be provided, for example, by pressing compaction, rolling compaction, or hammering compaction. Especially preferred here are pressures that are so high that the internal conductor is plastically deformed, especially such that the diameter of the internal conductor is reduced by a few percentage points, preferably approximately 5%.

The advantages of using magnesium oxide granulate can be applied especially strongly if the cross section of the internal conductor deviates from a circular shape, neglecting local deformation, which is realized by the pressing of the magnesium oxide grains. In this way, the surface provided for the interaction with magnesium oxide grains is increased.

It has been shown, however, that the ratio of the diameter of the internal conductor cross section to the thickness of the electrical insulation layer can influence the homogeneity of the pressure application. For example, it can be desirable if this ratio is at approximately 4:1.

If necessary, the moisture resistance, in particular, can be increased even more in that the compacted magnesium oxide granulate is impregnated at least in sections.

Also, through the addition of an impregnating agent at least in sections of the device, in particular, e.g., the addition of 0.5 vol % silicone resin, and subsequent heat treatment, a bonding of the magnesium oxide granulate grains with each other can be realized, which makes the resulting structure more robust and counteracts breaking away at the edges of the structure, such that magnesium oxide grains of the magnesium oxide granulate are bonded with each other and/or with the internal conductor and/or with the tubular metal sheath.

The method according to the invention for manufacturing a device with an internal conductor, which is arranged within the tube interior of a tubular metal sheath and is electrically insulated from this sheath with an electrically insulating material comprises the steps arranging the internal conductor in the interior of the tubular metal sheath,
inserting the electrically insulating material into empty volumes of the interior of the tubular metal sheath, and
compacting the electrically insulating material.

It is essential to the invention that the electrically insulating material is a magnesium oxide granulate made from magnesium oxide grains of different sizes with edges and projections, which is compacted in the radial direction so strongly that at least sections, especially edges and projections of magnesium oxide grains, under local deformation of the internal conductor and/or the tubular metal sheath, are pressed into the internal conductor or into the tubular metal sheath.

Here, it is especially preferred that the electrically insulating material is introduced into empty volumes of the interior of the tubular metal sheath such that the magnesium oxide granulate can trickle into the tubular metal sheath from one end side with the application of vibrations. This promotes not only the material transport within the free inner volume of the tubular metal sheath, but the pre-configuration of the magnesium oxide grains of the magnesium oxide granulate achieved in this way also proves helpful for reducing and/or preventing any empty volumes.

Preferably, as the electrically insulating material, a magnesium oxide granulate is used, which is supplied such that the electrically insulating material has a tapped density of less than 2.45 g/cm³ before the compacting process.

To make the electrically insulating material more stable and, in particular, to also counteract it breaking away in edge areas, it is advantageous if at least in sections, a magnesium oxide granulate displaced with an impregnating agent, in particular, a silicone resin, is inserted as an electrically insulating material into the interior of the tubular metal sheath and then, but not immediately afterward, a heat treatment step is performed, so that magnesium oxide grains are bonded with each other and/or with the internal conductor and/or with the tubular metal sheath.

In one preferred embodiment of the method, in an end section of the device, the internal conductor is exposed and shaped by machine finishing. This can be realized, for example, by metal-cutting machining of the end section and the internal conductor.

It is especially preferred if, for the radial compacting, a pressure is applied that is so high that it leads to plastic deformation of the internal conductor, in particular, a cross-sectional reduction of the internal conductor of a few percentage points, i.e., in particular, between 2 and 10 percent. The ideal pressure, however, is dependent on the material and the geometry of the respective internal conductor and the tubular metal sheath, which can vary. The compacting can be realized, in particular, by pressing compaction, rolling compaction, or hammering compaction.

Briefly stated, the preferred present invention is also directed to a method for manufacturing a device (10, 20, 30) with an internal conductor (11, 21, 31), which is arranged within the tube interior of a tubular metal sheath (12, 22*a*, 22*b*, 22*c*, 32) and is electrically insulated from this sheath with an electrically insulating material (13, 23, 33). The method preferably includes the steps of arranging the internal conductor (11, 21, 31) in the interior of the tubular metal sheath (12, 22*a*, 22*b*, 22*c*, 32), inserting the electrically insulating material (13, 23, 33) into the interior of the tubular metal sheath (12, 22*a*, 22*b*, 22*c*, 32), and compacting the electrically insulating material (13, 23, 33). The electrically insulating material (13, 23, 33) is preferably a magnesium oxide granulate made from magnesium oxide grains (14, 24, 34) of different sizes with edges and projections (24*a*, 34*a*), which is compacted in the radial direction so strongly that at least sections, especially edges and projections (24*a*, 34*a*) of magnesium oxide grains (14, 24, 34) are pressed, under local deformation of the internal conductor (11, 21, 31) and/or the tubular metal sheath (12, 22*a*, 22*b*, 22*c*, 32) into the internal conductor (11, 21, 31) or into the tubular metal sheath (12, 22*a*, 22*b*, 22*c*, 32). Inserting the electrically insulating material (13, 23, 33) into the interior of the tubular metal sheath (12, 22*a*, 22*b*, 32) is realized such that the magnesium oxide grains (14, 24, 34) of the magnesium oxide granulate can trickle into the tubular metal sheath (12, 22*a*, 22*b*, 22*c*, 32) from one end side under vibrating conditions. The electrically insulating material (13, 23, 33) preferably has a tapped density of less than two and forty-five hundredths grams per cubic centimeter (2.45 g/cm³) before the compacting process. A magnesium oxide granulate is preferably displaced, at least in sections, with an impregnating agent, especially a silicone resin, is inserted as an electrically insulating material (13, 23, 33) into the interior of the tubular metal sheath (12, 22*a*, 22*b*, 32) and a heat treatment step is performed, so that the magnesium oxide grains (14, 24, 34) are bonded with each other and/or with the internal conductor (11, 21, 31) and/or with the tubular metal sheath (12, 22*a*, 22*b*, 22*c*, 32). An end section of the device (10, 20, 30) and the internal conductor (11, 21, 31) are preferably exposed and shaped by machine finishing. In compacting process, a pressure is preferably applied that is so high that it produces a plastic deformation of the internal conductor (11, 21,31), especially a cross-sectional reduction of the internal conductor (11, 21, 31) of a few percent. A magnesium oxide granulate is preferably used with a grain size distribution, whose maximum is in the range between thirty to three hundred micrometers (30-300 µm). The full width half maximum (FWHM) width of the grain size distribution of the magnesium oxide granulate preferably covers a range between approximately thirty micrometers (30 µm) and above one hundred micrometers (100 µm)

Preferably, a magnesium oxide granulate is used with a grain size distribution whose maximum is in the range between 30 µm and 300 µm. Here, it is especially preferred if the width of the grain size distribution covers a range between approximately 30 µm and above 100 µm.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings:

FIG. 1 is a partial cross-sectional, side elevational view of a first embodiment of a device falling under the classification of the preferred invention in the form of a feedthrough in the use case;

FIG. 2a is a partial cross-sectional, side elevational view of a second embodiment of a device falling under the classification of the preferred invention in the form of a feedthrough;

FIG. 2b is an enlarged detail of the cross-sectional portion of the device of FIG. 2a, taken from within the circle labeled C of FIG. 2a;

FIG. 3a is a cross-sectional view from a first phase of a manufacturing process of a device falling under the classification of the preferred invention showing grains being introduced into a tubular metal sheath;

FIG. 3b is an enlarged detail cross-sectional view of a portion of FIG. 3a, taken from within the circle labeled A of FIG. 3a;

FIG. 4a is a cross-sectional view from a second phase of the manufacturing process of a device falling under the classification of the invention, showing grains in the tubular metal sheath;

FIG. 4b is an enlarged detail cross-sectional view of a portion of FIG. 4a, taken from within the circle labeled B of FIG. 4a.

DETAILED DESCRIPTION OF THE INVENTION

Figure 5:
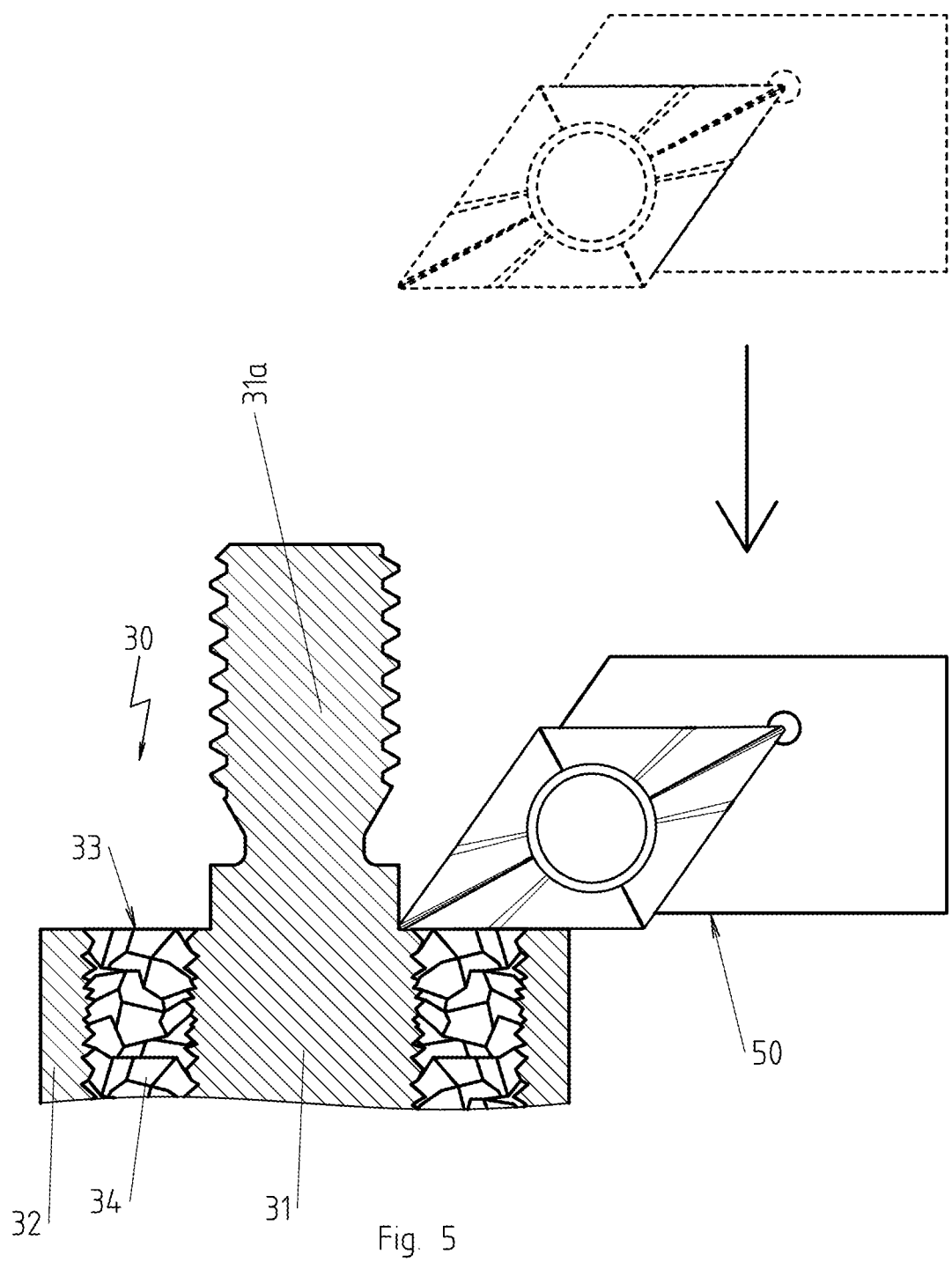
FIG. 5 is a cross-sectional view from an additional, optional phase of the manufacturing process of a device falling under the classification of the invention.

FIG. 1 shows a device 10, which is constructed as a feedthrough through a metal wall 1 and is welded with weld seams 2 with the metal wall 1, through which it is fed. The device 10 has an internal conductor 11, which is arranged within the tube interior of a tubular metal sheath 12 and is electrically insulated from this sheath with a compacted, electrically insulating material 13. A connection section 11a of the internal conductor 11 projects out of the tubular metal sheath 12 and is provided on the end side with a thread formed in the connection section 11a of the internal conductor 11, on which an electrical contact 4 is fixed with the nut 3. Accordingly, under proper use, the device 10 is temporarily subjected to a considerable torque M, which must be sustained by the electrically insulating material 13, namely when the nut 3 for securing the contact 4 is tightened using a wrench 5.

This is made possible in that the electrically insulating material is a magnesium oxide granulate, which consists of magnesium oxide grains 14 of different size with edges and projections, and was compacted, in particular, so that sections, especially edges and projections of magnesium oxide grains 14, under local deformation of the internal conductor 11 and the tubular metal sheath 12 are pressed into the internal conductor 11 or into the tubular metal sheath 12.

The embodiment of the device 20 shown in FIGS. 2a and 2b is likewise a feedthrough, which, however, is not yet in a use situation. The device 20 likewise has an internal conductor 21, which is arranged within the tube interior of segments of a tubular metal sheath 22a,22b,22c and thus in at least one tubular metal sheath and is electrically insulated from this sheath with a compacted, electrically insulating material 23. A connection section 21a of the internal conductor 21 also projects here out of the tubular metal sheath and is provided on one side with a thread formed in the connection section 21a of the internal conductor 21. The segments of the tubular metal sheath 22a,22b,22c are separated from each other by areas 25, in which the tubular metal sheath and the electrically insulating material are removed down to the internal conductor 21. This arrangement increases, on one hand, the creep resistance of the device 20, but also leads to higher mechanical loads that must be sustained by the material 23.

This is enabled, as can be seen especially well in the detailed view of FIG. 2b, in that the electrically insulating material 23 is a magnesium oxide granulate, which consists of magnesium oxide grains 24 of different sizes with edges and projections 24a, and was compacted, in particular, so that sections, especially edges and projections 24a of magnesium oxide grains 24, under local deformation of the internal conductor 21 and the segments of the tubular metal sheath 22b, are pressed into the internal conductor 21 or into the segment of the tubular metal sheath 22b.

It is worth noting in FIG. 2b that despite the edges and projections 24a of the magnesium oxide grains 24, after the compaction, there is essentially a flat contact between the magnesium oxide grains 24 due to the high pressure, so that there are almost no empty volumes between the magnesium oxide grains 24.

FIG. 2a also makes clear, in particular, that such a feedthrough can be manufactured simply through metal-cutting machining of a section of a mineral-insulated sheathed cable, which is one embodiment of the invention.

FIGS. 3a and 3b, 4a and b, as well as 5 each show a snapshot of phases of manufacturing a device 30 shown only in sections, which is why identical reference symbols are used in these figures.

In the phase shown in FIGS. 3a and 3b, the internal conductor 31 is already arranged in the interior 35 of the tubular metal sheath 32, and the electrically insulating material 33 in the form of magnesium oxide grains 34 of different sizes with edges and projections 34a trickles, with the application of vibrations, from an end side of the tubular metal sheath 32 into the still remaining interior 35 of the tubular metal sheath 32 already partially filled with such magnesium oxide grains 34.

As the detailed view of FIG. 3b shows, here in the already filled area, there is initially a loose arrangement of magnesium oxide grains 34, which has, however, considerable empty volumes 36 and thus initially does not appear to form a promising starting structure for creep-resistant electrical insulation that also reliably prevents the penetration of moisture.

In the phase shown in FIGS. 4a and 4b, this arrangement, as shown by the arrows in FIG. 4a, has been compacted in the radial direction so strongly that sections 34a, especially edges and projections of magnesium oxide grains 34, under local deformation of the internal conductor 31 and the tubular metal sheath 32, are pressed into the internal conductor 31 or into the tubular metal sheath 32, which clearly shows the change of the outer surface of the internal conductor 31 or the inner surface of the tubular metal sheath 32. Supposedly through this deformation, however, a new arrangement of the magnesium oxide grains 34 is also enabled, which essentially eliminates the empty volumes 36 still present in FIG. 3b.

FIG. 5 shows that, with a metal-cutting processing tool 50, relatively complex geometries of feedthroughs, including a connection section 31a for the internal conductor 31, can also be realized in a simple way from mineral-insulated sheathed cable manufactured in this way.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

1 Metal wall
2 Weld seam
3 Nut
4 Electrical contact
5 Wrench
10,20,30 Device
11,21,31 Internal conductor
12,22a,22b,22c,32 Tubular metal sheath
13,23,33 Electrically insulating material
14,24,34 Magnesium oxide grain
24a,34a Edges and projections
25 Area
35 Interior
36 Empty volume
50 Processing tool
M Torque

The invention claimed is:

1. A feedthrough device for feeding electricity through a wall made of metal, the feedthrough device comprising:
an internal conductor arranged within a tubular metal sheath, the internal conductor electrically insulated from the tubular metal sheath with a compacted, electrically insulating material, the compacted, electrically insulating material comprised of a compacted magnesium oxide granulate, the compacted magnesium oxide granulate constructed of magnesium oxide grains of different sizes with edges and projections, the edges and projections of the magnesium oxide grains being radially pressed under local deformation of one of the internal conductor and the tubular metal sheath into an interior between the internal conductor and the tubular metal sheath,
wherein an end section of the internal conductor is exposed from the tubular metal sheath and shaped by machine finishing.

2. The feedthrough device according to claim 1, wherein a cross section of the internal conductor deviates from a circular shape, disregarding local deformation.

3. The feedthrough device according to claim 1, wherein the compacted magnesium oxide granulate is impregnated at least in sections.

4. The feedthrough device according to claim 3, wherein the magnesium oxide grains of the compacted magnesium oxide granulate are bonded with each other through an impregnating agent, the magnesium oxide granulate, the internal conductor and the tubular metal sheath bonded to each other through the impregnating agent and through subsequent heat treatment.

5. The feedthrough device according to claim 1, wherein inserting the electrically insulating material into the interior of the tubular metal sheath is realized such that the magnesium oxide grains of the magnesium oxide granulate trickle into the interior from one end side under vibrating conditions.

6. The feedthrough device according to claim 1, wherein the electrically insulating material has a tapped density of less than two and forty-five hundredths grams per cubic centimeter (2.45 g/cm$^3$) before the compacting the electrically insulating material.

7. The feedthrough device according claim 1, wherein the magnesium oxide granulate is impregnated with an impregnating agent, the impregnating agent comprised of a silicone resin, the magnesium oxide being inserted into the interior, the magnesium oxide with the impregnating agent being heated so that the magnesium oxide grains are bonded with at least one of each other, the internal conductor and the tubular metal sheath.

8. The feedthrough device according to claim 1, wherein pressure is applied to produce a plastic deformation of the internal conductor, the plastic deformation causing a cross-sectional reduction of the internal conductor of between two percent and ten percent.

9. The feedthrough device according to claim 1, wherein the magnesium oxide granulate has a grain size distribution, the grain size distribution being in a range between thirty and three hundred micrometers (30-300 µm).

10. The feedthrough device according to claim 9, wherein a full width half maximum (FWHM) width of the grain size distribution of the magnesium oxide granulate covers a range between approximately thirty micrometers (30 µm) and above one hundred micrometers (100 µm).

11. A feedthrough device for feeding electricity through a wall made of metal, the feedthrough device comprising:
an internal conductor arranged within a tubular metal sheath, the internal conductor electrically insulated from the tubular metal sheath with a compacted, electrically insulating material, the compacted, electrically insulating material comprised of a compacted magnesium oxide granulate, the compacted magnesium oxide granulate constructed of magnesium oxide grains of different sizes with edges and projections, the edges and projections of the magnesium oxide grains being radially pressed under local deformation of one of the internal conductor and the tubular metal sheath into an interior between the internal conductor and the tubular metal sheath, wherein pressure is applied to produce a plastic deformation of the internal conductor causing a cross-sectional reduction of the internal conductor.

12. The feedthrough device according to claim 11, wherein a cross section of the internal conductor deviates from a circular shape, disregarding local deformation.

13. The feedthrough device according to claim 11, wherein the compacted magnesium oxide granulate is impregnated at least in sections.

14. The feedthrough device according to claim 13, wherein the magnesium oxide grains of the compacted magnesium oxide granulate are bonded with each other through an impregnating agent, the magnesium oxide granulate, the internal conductor and the tubular metal sheath bonded to each other through the impregnating agent and through subsequent heat treatment.

15. The feedthrough device according to claim 11, wherein inserting the electrically insulating material into the interior of the tubular metal sheath is realized such that the magnesium oxide grains of the magnesium oxide granulate trickle into the interior from one end side under vibrating conditions.

16. The feedthrough device according to claim 11, wherein the electrically insulating material has a tapped density of less than two and forty-five hundredths grams per cubic centimeter (2.45 g/cm$^3$) before the compacting the electrically insulating material.

17. The feedthrough device according to claim 11, wherein an end section of the internal conductor is exposed from the tubular metal sheath and shaped by machine finishing.

18. The feedthrough device according to claim 11, wherein the magnesium oxide granulate has a grain size distribution, the grain size distribution being in a range between thirty and three hundred micrometers (30-300 μm).

19. The feedthrough device according to claim 18, wherein a full width half maximum (FWHM) width of the grain size distribution of the magnesium oxide granulate covers a range between approximately thirty micrometers (30 μm) and above one hundred micrometers (100 μm).

* * * * *